United States Patent [19]

Raman

[11] Patent Number: 5,555,398
[45] Date of Patent: Sep. 10, 1996

[54] WRITE BACK CACHE COHERENCY MODULE FOR SYSTEMS WITH A WRITE THROUGH CACHE SUPPORTING BUS

[75] Inventor: Srinivas Raman, Folsom, Calif.

[73] Assignee: Intel Corporation, Santa Clara, Calif.

[21] Appl. No.: 228,145

[22] Filed: Apr. 15, 1994

[51] Int. Cl.$^6$ .................................................. G06F 12/00
[52] U.S. Cl. ..................... 395/470; 395/420; 364/240; 364/242.31; 364/243.4; 364/245.6; 364/260.1; 364/DIG. 1
[58] Field of Search ................................ 395/856, 842, 395/841, 800, 477, 287, 468–473, 306, 412, 420, 726; 365/189.04, 220, 230.01, 233; 371/21.1, 42

[56] References Cited

U.S. PATENT DOCUMENTS

| | | | |
|---|---|---|---|
| 4,167,782 | 9/1979 | Joyce et al. | 395/468 |
| 5,119,485 | 6/1992 | Ledbetter, Jr. et al. | 395/473 |
| 5,226,144 | 7/1993 | Moriwaki et al. | 395/448 |
| 5,247,648 | 9/1993 | Watkins et al. | 395/470 |
| 5,335,335 | 8/1994 | Jackson et al. | 395/448 |
| 5,353,415 | 10/1994 | Wolford et al. | 395/306 |
| 5,353,423 | 10/1994 | Hamid et al. | 395/470 |

*Primary Examiner*—Alpesh M. Shah
*Attorney, Agent, or Firm*—Blakely, Sokoloff, Taylor & Zafman

[57] ABSTRACT

A system and method for guaranteeing coherency between a write back cache and main memory in a computer system that does not have the bus level signals for a conventional write back cache memory. Cache coherency can be maintained by writing back all modified data in the cache prior to execution of the command that initiate the DMA or Bus Master transfer to or from main memory. When bus snooping logic detects writes from the CPU, the cache and main memory are synchronized. After synchronization, the bus snooper continues to look for access hits to modified data in the cache. If hits occurs and it is a DMA cycle, the CPU is prevented from further accesses to cache until after the DMA transfer, modified bytes are written back to main memory. If it is a bus master device seeking access to main memory, the CPU is prevented from further accesses to cache until the modified bytes are written back to main memory.

6 Claims, 7 Drawing Sheets

| I/O ADDRESS | DESCRIPTION |
|---|---|
| 0000h | DMA channel 0, memory address register |
| 0001h | DMA channel 0, transfer count register |
| 0002h | DMA channel 1, memory address register |
| 0003h | DMA channel 1, transfer address register |
| 0004h | DMA channel 2, memory count register |
| 0005h | DMA channel 2, transfer count register |
| 0006h | DMA channel 3, memory address register |
| 0007h | DMA channel 3, transfer count register |
| 0008h | DMA channel 0-3, status register |
| 000Bh | DMA channel 0-3, mode register |
| 000Ch | DMA Clear Byte Pointer |
| 000Dh | DMA Master Clear Byte |
| 0081h | DMA channel 2, page table address register |
| 0082h | DMA channel 3, page table address register |
| 0083h | DMA channel 1, page table address register |
| 0087h | DMA channel 0, page table address register |
| 0089h | DMA channel 6, page table address register |
| 008Ah | DMA channel 7, page table address register |
| 008Bh | DMA channel 5, page table address register |
| 008Fh | DMA channel 4, cascade to channels 5-7 |
| 00C0h | DMA channel 4, memory address register |
| 00C2h | DMA channel 4, transfer count register |
| 00C4h | DMA channel 5, memory address register |
| 00C6h | DMA channel 5, transfer count register |
| 00C8h | DMA channel 6, memory address register |
| 00CAh | DMA channel 6, transfer count register |
| 00CCh | DMA channel 7, memory address transfer |
| 00CEh | DMA channel 7, transfer count register |
| 00D0h | DMA channel 5-7 status register |
| 00D2h | DMA write request register |
| 00D6h | DMA channel 5-7 mode register |
| 00D8h | DMA Clear Byte Pointer |
| 00DAh | DMA Master Clear Byte |

FIG. 6

| | |
|---|---|
| STANDARD I/O ADDRESSES | 0000h-00FFh (except 0008h and 00D0h)<br>0278h-027Bh<br>02F8h-02FFh<br>0378h-037Bh<br>03B4h-03B5h<br>03BAh, 03BCh-03CCAb, 03CCh<br>03CEh-03CFh<br>03D4h-03D5h, 03DAh<br>03D4h-03D5h, 03DAh<br>03F8h-03FFH |
| NON-STANDARD I/O ADDRESSES | 0008h, 00D0h, 0200h-0277h<br>027Ch-02F7h<br>0300h-0377h<br>037Ch-03B3h<br>03B6h-03B9h<br>03BBh-03CBh, 03CDh<br>03D0h-03D3h<br>03D6h-03D9h<br>03DBh-03F7h<br>0400h- FFFFh |
| STANDARD MEMORY ADDRESSES | 00000000h-Maximum base memory address<br>A0001h-BFFFFh<br>E00001h-FFFFFh<br>00100000h-Maximum extended memory addresses |
| NON-STANDARD MEMORY ADDRESSES | (Maximum base memory address + 1) - A0000hf<br>C0000h-E0000h<br>(Maximum extended memory address + 1) - FFFFFFFFh |
| STANDARD INTERRUPTS: | IRQ0-IRQ2, IRQ8 and IRQ13 |
| NON-STANDARD INTERRUPTS: | IRQ3-IRQ7, IRQ9-IRQ12, IRQ14-IRQ15 |

FIG. 7

WRITE BACK CACHE COHERENCY MODULE FOR SYSTEMS WITH A WRITE THROUGH CACHE SUPPORTING BUS

CROSS-REFERENCE TO RELATED APPLICATIONS

The following co-pending U.S. patent applications relate to the present application. Each of the listed co-pending applications are assigned to the same assignee as the present application.

1) U.S. patent application Ser. No. 08/130,025, Filed Sep. 30, 1993, and titled, "LOW COST WRITETHROUGH CACHE COHERENCY APPARATUS AND METHOD FOR COMPUTER SYSTEMS WITHOUT A CACHE SUPPORTING BUS"

2) U.S. patent application Ser. No. 08/088,205, Filed Jul. 6, 1993, and titled, "CACHE COHERENCY MECHANISM FOR WRITEBACK CACHE ON NON-WRITEBACK BUSSES"

3) U.S. patent application Ser. No. 07/998,938, Filed Dec. 30, 1992, now abandoned, and titled, "CACHE COHERENCY MAINTENANCE ON NON-CACHE SUPPORTING BUSES"

BACKGROUND OF THE INVENTION

1. Field of the Invention

The present invention relates to cache coherency control. More particularly, it relates to a write back cache coherency control system and method for computer systems having a bus that does not support write back caches.

A cache memory is a small very fast memory used to store frequently used instructions and data. Cache memory is a tradeoff between speed and cost. Ideally, a computer would have main memory that is as fast as the CPU. But while such memory exists, it is much more expensive than main memory. Fortunately, a phenomenon known as the locality of execution principle exists which makes caching possible. This principle states that the CPU tends to use the same memory locations regularly. In general, the CPU follows the 80/20 rule which states that 20% of the memory addresses will be used 80% of the time. This being the case, a small, very fast and expensive memory can be used in conjunction with a much larger, slower and inexpensive main memory to gain most of the performance of an all high speed main memory, but at a small fraction of the cost.

A typical cache memory consists of very fast static RAM and a very fast cache controller. In operation, when the CPU requests data from main memory, the cache controller checks to see if the data is in the cache. This check is done with very fast logic. Ideally, the speed of the cache is tuned to the speed of the CPU, and with on board caches this happens automatically. If the requested data is in the cache, it is delivered much more quickly than if it were in main memory. This situation is called a cache hit. If the requested data is not in the cache, the CPU must access the slower main memory for the data. This is called a cache miss. Data retrieved during a cache miss is also written to cache for future use. In order to write new data into cache, other data must be eliminated. This is called a line replacement in cache. The cache controller performs this function and attempts to maintain the most frequently used data in cache.

However there are architectural problems with a cache memory. A first problem occurs when the CPU has modified data in cache memory and an external device needs to read that data. The CPU has copied the data from some locations in main memory into its cache memory. The CPU may then be using and modifying the data in cache. There are then certain locations in main memory with data which may be different than the data in the corresponding locations in cache. This doesn't matter for the CPU since it always looks first in the cache and thus has the most current data. However, if an external device (one other than the CPU) needs the same data, it would read what is called "stale or dirty" data.

A second problem occurs when the CPU has modified data in the cache and an external device writes new data into the corresponding locations in main memory. In this case, the data in the cache becomes stale.

These two situations give rise to the general problem known as cache coherency. That is, how does the system insure that the CPU and all external devices are using the same data when a cache memory is employed.

The solution is of course simple when the CPU directly supervises all accesses to main memory. But, modern, high performance architectures allow external devices to access main memory directly.

The solution for the external device read problem is related to the write back strategy. That is, whenever the CPU modifies the data in its cache, the issue is when does the CPU cause the modified data to be put into main memory. There are two approaches known as write through or write back.

In a write through cache, whenever the CPU modifies any data in cache, it immediately writes the new information to the corresponding locations in main memory. This approach assures the system that any device which accesses main memory will have access to exactly the same data as in the cache.

In a write back cache scheme, the CPU does not modify the main memory in every memory update cycle. Rather, the CPU keeps operating out of cache for so long as an external device does not seek access to the memory locations that have been cached or memory locations in cache that need to be replaced have not been modified.

In order to implement cache coherency, system logic external to the CPU is provided. The logic typically resides in a chip set on the mother board. The system logic monitors the address and control busses looking for requests from external devices seeking access to addresses in main memory that have been cached. This is known as a snoop or an inquire cycle. The inquire occurs regardless of whether the system is write through or write back. In the case of an external device seeking to write to a main memory address that has been cached by the CPU, an action known as "invalidate" is invoked. The system logic detects the attempt by the external device to write to main memory and runs an inquire/invalidation cycle to the CPU. In a write through cache, this results in the CPU invalidating the cache line that contains data that is being modified by the external device.

In the case of a write back cache, if the inquiry cycle results in a hit to data in the cache that is modified, then a back off command is issued to the inquiring external device. When the external device receives a backoff command, it stops the operation it was doing and gives control of the bus back to the CPU. The CPU then writes the modified data from the cache to the corresponding locations in main memory, then invalidates the line in cache containing the modified data and then gives control of the bus back to the external device. The external device will then re-execute the cycle that was interrupted by the back off command.

Thus in a conventional implementation of a cache memory, the bus is designed to support one of the two coherency schemes: write through or write back. In a system supporting a write through cache, the bus is designed to support cache invalidation. In a system supporting a write back cache, the bus needs to not only have the signals to support cache invalidation, but also have signals to supply inquiry and write back.

However, there is a very large installed base of computers that either do not support a write back cache or support no cache at all, and some significant number of the users of such computers could have an interest in upgrading their computer by retrofiting them with a microprocessor containing a cache memory. This would be a low cost approach to improved performance. But, in order to do this, it is necessary to develop a way of maintaining cache coherency on a computer bus that does not have the conventional hardware to support a cache memory.

Of the applications referenced in the Cross-reference to Related Applications section of this application the Ghori and second Kulkarni application describe two ways to implement a write through cache on a computer system that supports no cache. The second Kulkarni application deals with both.

The Ghori describes a cache coherency module ("CCM") added to the microprocessor chip that snoops the addresses put on the bus. When the CCM detects that the DMA is programmed to do a write to main memory, the entire cache is flushed and the page in main memory (in MS DOS systems, main memory is divided into pages of 64K bytes) that is being written to is kept non-cacheable until the data write is complete. Completion of the data write is determined by monitoring the application software's interrogation of the DMA status register with a software initiated interrupt. The cache is turned off completely when cascade mode is implemented since the CPU does not know which areas of memory may become incoherent.

The second Kulkarni application deals exclusively with write through caches on busses that do not support write through cache. The method of the second Kulkarni application consists of detecting the period of time during which the DMA controller is programmed to allow an external device to write to main memory. The cache memory is flushed at the end of the period of time during which the DMA controller is programmed to allow an external device to write to main memory. In addition, the method detects all reads to non-standard I/O and memory space made by the CPU and all non-standard interrupts during the time which the DMA controller is programmed to allow an external device to write to main memory and flushes the cache memory after each such detection.

The apparatus of the second Kulkarni application which is used to implement the method of that application is a cache coherency module which consists of a bus snooping sub-module connected to the bus for monitoring address, control and data signals on the bus; a DMA address table containing the addresses of registers of the DMA controller; a system address table containing at least the addresses of all non-standard I/O and memory and non-standard interrupts; a logic sub-module connected to the cache memory and the bus snooping sub-module and communicating with the DMA address table and the system address table. The logic sub-module uses the information in the various tables to interpret the monitored bus signals and supplies a signal to the cache memory causing the flush thereof (1) upon the indication that a non-standard I/O read has occurred while the DMA is programmed to allow the external I/O device to write to main memory and (2) at the end of the period that the DMA is programmed to allow the external I/O device to write to main memory. The cache coherency module is further adapted to recognize the presence of a bus master device in the computer system and thereafter to always supply a signal to the cache memory causing it to flush upon the indication of a non-standard I/O read, or a non-standard interrupt regardless of the status of the DMA controller.

The first Kulkarni application cross-referenced above deals with write back cache coherency for systems having busses that either support write through caching only or no caching at all on the bus; however this application does not deal with all possibilities that can create incoherency and deals with others in a less than optimum way.

In the first Kulkarni application, the cache is flushed rather than synchronized. To flush means to invalidate the entire contents of the cache. In the case where one has a cache on a bus that does not support cache at all, one must flush the cache. But in cases where the objective is to support a write back cache in a write through system, the high performance objective is to synchronize the cache and main memory. The term synchronized and coherent mean the same. The first Kulkarni solution would work, but it would be slower.

The present invention also differs from the first Kulkarni in the following ways. Kulkarni uses a read to non-standard address or a non-standard interrupt to indicate the end of a data transfer. With a write back cache, there is no need to be concerned with the end of a data transfer since the cache and main memory were synchronized immediately prior to the transfer. In addition, with a write back cache system, it is necessary to synchronize on every non-standard interrupt. This is necessary because the CPU could logically set up a transfer by a write to either non-standard I/O space or non-standard memory space, but with a protocol that allowed for an indication of completion of the transfer by a non-standard interrupt. Under this circumstance, if the write back cache memory and main memory are not synchronized upon detection of the non-standard interrupt, incoherency could occur. The incoherency would be as follows:

The CPU and a busmaster card communicate via a protocol that sets up locations on memory that are referred to as mailboxes. The CPU leaves instructions for the busmaster device in the mailboxes. The protocol also gives the busmaster device the ability to tell the CPU that it has finished a task in a mailbox by way of a non-standard interrupt.

The incoherency can occur when there are more than one mailbox which is possible under the protocol. Suppose that the CPU has filled two mailboxes with instructions—mailbox 1 has instructions for memory area 1 and mailbox 2 has instructions for memory area 2. After completion of the instructions in mailbox 1, the busmaster sends a non-standard interrupt to the CPU telling it that it is finished with the task defined in mailbox 1. The busmaster device then goes on to perform the tasks set out in mailbox 2. In the meantime, the CPU can work with the data in memory area 1 since it has received the indication that the busmaster has completed its assigned job. Also, the CPU may set up new and different instructions in mailbox 1. When the busmaster completes the instructions in mailbox 2, it again sends a non-standard interrupt to the CPU indicating that has completed its task. The busmaster then goes back to mailbox 1 looking for additional tasks. The new commands in mailbox 1 and/or the data in memory area 1 would not be the appropriate command data unless a synchronization of cache occurs on completion of commands in mailbox 2. Such a case could occur when the CPU does not indicate that new commands have been posted in mailbox 1 or new data is available in memory area 1 by a write to a non standard I/O or memory location.

SUMMARY OF THE INVENTION

Accordingly it is an object of the invention to provide a pseudo write back cache control system that is comprehensive in that it insures coherency between the cache memory and main memory under all logically possible conditions.

This and other objects are achieved by the present invention. This invention is an improved and completely comprehensive pseudo write back cache coherency apparatus and method applicable to computers which are configured to include: one or more busses that contain cache invalidation but not cache inquiry and write back signals, a CPU connected to one or more bus, a main memory and a DMA controller connected to the busses. In addition, there is at least one external I/O device connected through the DMA controller to a bus. And there may be a plurality of addressable devices each connected to a bus. Added to this is a cache memory having a plurality of bytes organized into lines, and a plurality of status bits indicating at least whether a line is in a modified or exclusive state.

The invention consists of the following system: A cache tag array is added to the cache memory. The cache tag array contains one bit per byte in the cache memory and is adapted to indicate if a particular byte in cache is in the modified state. A cache coherency module is added to the system. The cache coherency module includes a bus snooping address comparitor which is connected to the bus and monitors at least address and control signals thereon. A system address sub-module which includes a DMA address table containing the addresses of registers of said DMA controller, an I/O address table containing the addresses of all non-standard I/O devices; a memory table containing the addresses of all non-standard memory addresses and means for identifying non-standard interrupts. The tables of the system address sub-module are in or are available to the cache coherency module. A logic sub-module is connected to the address comparitor sub-module and the system address sub-module and provides control signals to the cache memory. The logic sub-module in conjunction with the address comparitor sub-module and the system address sub-module perform the following functions:

a. It indicates when the DMA controller is programmed by the CPU to allow an external I/O device to read or write to main memory. Upon such an event, it supplies a signal to the cache memory causing the synchronization thereof with the main memory;

b. It also indicates when the CPU performs a write to a non-standard I/O or memory address. Upon such an event, it supplies a signal to the cache memory causing the synchronization thereof with the main memory;

c. It also indicates when a non-standard interrupt has been sent to the CPU by an external device; Upon such an event, it supplies a signal to the cache memory causing the synchronization thereof with the main memory;

d. It further indicates when an inquiry cycle is being run and a hit to a modified line has occurred as a result thereof. When such an event occurs, it supplies a signal to the CPU that stops CPU access to the cache.

e. It also indicates when the external I/O device has completed its read or write to main memory as programmed by the DMA, f. Upon the indication that the external I/O device has completed its read or write to main memory, it also supplies a signal to cache memory causing any modified bytes in the cache to be written back to the main memory and changes the line containing the modified data to invalid.

The method according to the present invention of maintaining cache coherency consists of:

1. Monitoring the bus for and detecting the action consisting of the DMA controller being programmed to allow an external device to read or write to main memory. If such a action is detected, then the following steps are taken:

a. synchronizing the cache and main memory upon detection of said programming by the DMA; and b. monitoring the snoop inquire cycles on the bus and detecting any inquiry hit to modified data in the cache; and c. upon detecting an inquiry hit to modified data in the cache, preventing further access by the CPU to cache to until completion of the read or write to main memory by the external device programmed by the DMA is detected;

d. upon detection of the completion, writing back all bytes in cache memory that have been modified and causing the cache lines in which the modified data is contained to be put in the invalid state;

e. allowing the CPU to continue processing; and

2. Monitoring the bus for and detecting an action consisting of a write to non-standard I/O space by the CPU, a write to non-standard memory space by said CPU, or a non-standard interrupt. If such an event is detected, the following steps are taken:

a. synchronizing the cache and main memory after detecting such event;

b. monitoring the snoop inquire cycles on the bus and detecting any inquiry hit to modified data in the cache;

c. upon detecting an inquiry hit to modified data in the cache, preventing access by the CPU to the cache.

d. acquiring control of the system bus and writing back the modified data and causing the cache lines in which the modified data is contained to be put in the invalid state; and e. allowing the CPU to continue processing.

BRIEF DESCRIPTION OF THE DRAWING

The present invention will now be described in more detail in conjunction with the Drawing in which:

FIG. 6 is a table of DMA register addresses

FIG. 7 is a table of I/O and memory addresses and interrupts.

DETAILED DESCRIPTION OF THE PREFERRED EMBODIMENT

A cache memory system that operates in the write back mode in a computer system that does not support write back with bus signals is called a pseudo write back system. One design of such a system is descried by the first Kulkarni application. In general, a pseudo write back solution to cache coherency is based on the experimentally verified proposition that: The application software running on a CPU does not read or write to an area of main memory that the software has set up for transfers by any external device (either by the DMA controller of by bus Master devices) after the software has initiated the transfer and prior to an indication that the transfer is complete.

In ISA, EISA, MCA, PCI and VL bus systems, the system devices that can read or write to main memory are the CPU, the DMA controller and Bus Master devices.

In systems that do not provide bus level support for a write back cache, main memory to cache coherency can be maintained by writing back all modified data in the cache prior to execution of the command that initiate the DMA or Bus Master transfer to or from main memory. In conjunction with the basic software proposition, this is sufficient to guarantee coherency. The problem of coherency can thus be reduced to a problem of detecting all circumstances that initiate the DMA or Bus Master interaction with main memory.

Figure 1:
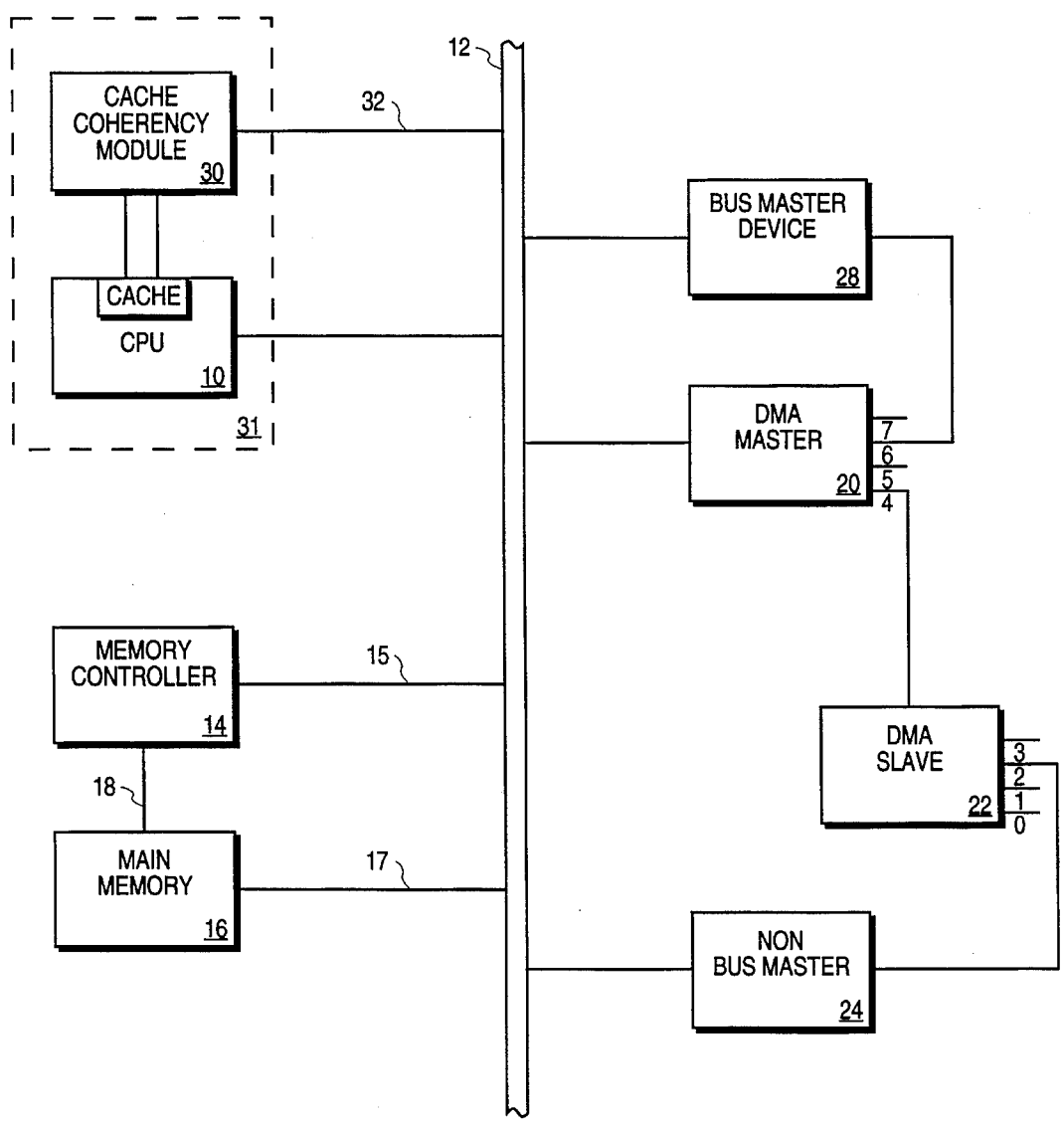
FIG. 1 is a block diagram of the general setting of the invention.

FIG. 1 shows a pseudo write back cache control scheme in its general setting. It illustrates the ISA at its most basic level. Referring to FIG. 1, the computer system consist of a CPU 10 connected to all portions of bus 12. The address and control portions of bus 12 are connected to main memory controller 14. A main memory array 16 is connected to the data portion of bus 12 and to memory controller 14 through interconnect 18. On each address cycle, memory controller 14 decodes the address signals to determine if there is an address in main memory to be accessed. If a main memory access is required, memory controller 14 sends control signals to main memory array 16, which causes either a read or a write of data to the data portion of bus 12.

A DMA controller (sometimes referred to as the DMA) 20 is connected to all three portions of bus 12. In ISA, the DMA controller is the device that allows all other devices to take control of the bus to access memory. The DMA is connected to all of the I/O devices in the system and acts like a gate in that an external device that seeks access to memory must first access the DMA controller. A second DMA 22 is connected by convention through channel 4 of DMA controller 20. This effectively increased the number of DMA channels to 7. DMA controller 20 which is connected directly to the bus is referred to as the "master" DMA controller, and DMA controller 22 is referred to as the "slave" DMA controller since the master controls the slave's access to the bus through its channel 4. A first external device 24 is connected to bus 12 and to channels 2 respectively of slave DMA controller 22. This device could be, for example, a floppy or hard disk or a fax card and will have addresses in I/O space. A bus master device, schematically illustrated as block 28, is connected directly to bus 12 and also to channel 6 of DMA controller 20.

In accordance with the present invention, a cache coherency module (CCM) 30 is added to the computer system architecture. This module may be implemented as a gate array, custom integrated hardware or microcode embodiment using conventional techniques. In a preferred embodiment, it is on the same chip a the CPU and cache memory as indicated by dotted line 31 in FIG. 1. CCM 30 is connected to all portions of bus 12 by line 32.

Figure 2:
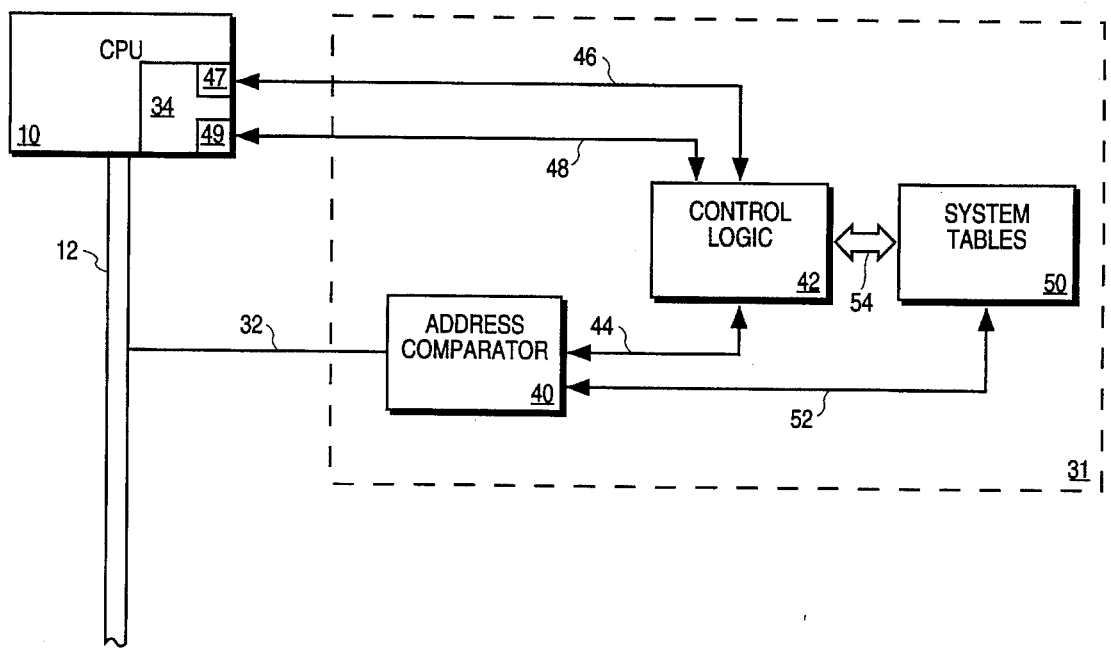
FIG. 2 is a more detailed block diagram of the invention.

FIG. 2 shows a more detailed block diagram of cache coherency module 30. The division of functions ascribed to the particular sub module to be described hereafter is arbitrary in the sense that many of the functions described as being in one sub-module could be in a different sub-module. Referring now to FIG. 2, CCM 30 comprises an address comparator sub-module 40 coupled to bus 12 via line 32. Address comparator 40 receives and interprets address, data, and control signals. Address comparator 40 is coupled to control logic 42 on line 44. Control logic 42 comprises circuitry for generating a cache control signal on line 46 to the controller 47 of cache memory 34 and on line 48 to cache tag array 49 of cache memory 34.

System address table 50 is coupled to address comparator 40 by line 52 and to control logic 42 by line 54. System address table 50 comprises a list of addresses corresponding to registers for DMA controllers 20 and 22 as set out in FIG. 7. These register addresses are well known and set out in the copending applications. The registers are used by CPU 10 to program DMA controllers 20 and 22 for an access to main memory 14. CPU 10 accesses the registers by putting an address of the desired register on bus 12.

Any DMA address presented on bus 12 is monitored by address comparator 40. By comparing the address received by address comparator 40 with the address in DMA controller address table 50, address comparator 40 may determine if an address presented on bus 12 is an access to one of the registers of DMA controller 20 or 22. In this manner, address comparator 40 determines when CPU 10 is programming a DMA controller for an access to main memory 14. This information is passed to control logic 42.

CCM 30 monitors bus 12 to determine when either DMA controllers 20 or 22 is being programmed by CPU 10 for access to main memory 16. CCM 30 also monitors bus 12 to determine when there is either an interrupt, or a read to I/O space.

In addition to the DMA, there are several other system devices that have standard addresses in I/O space and memory space. These are the mother board devices other than a DMA slave. However, none of these devices have the ability to modify memory. Thus, a write to a device in standard I/O space other than to the DMA can have no effect on data coherency and can be ignored.

However a write to non-standard I/O space could indicate that the CPU is setting up a bus master device to transfer data, or it could be meant for some other device not transferring data. CCM 30 cannot tell which. Thus, to make absolutely sure that data remains coherent, the CCM must assume that a write to non-standard I/O space indicates that an external device is being set up for a transfer.

In a manner analogous to writes to non-standard I/O space, writes to non-standard memory space could also indicate that the CPU is setting up a bus master device to transfer data. In MS DOS based systems, there is a special section of memory space between address 640K and 1 meg called upper memory. Portions of this address space are reserved for specific functions such as BIOS and video memory. However, there are "holes" in this space that are not reserved. These holes are called non-standard memory space. Addresses in non-standard memory space are occasionally used by system manufacturers for I/O devices. Accordingly, system table 50 includes the addresses of standard and non-standard I/O space, the addresses of standard and non-standard memory space and a table of standard and non-standard interrupts as set out in FIG. 7.

The present invention recognizes that non-standard interrupts are indicators of possible incoherency with write back caches in a system whose bus supports write through caches only. Just like writes to non-standard I/O or non-standard main memory, the occurrence of a non-standard interrupt, must trigger synchronization of cache and main memory. This insures coherency because it is one particular instance in which coherency could be lost. FIG. 7 is a list of non-standard interrupts.

According to another aspect of the invention, a cache tag array 49 has been added to the cache memory. As is well known, a line in a cache consists of a multiplicity of bytes such as 16. In a system that supports a write back cache, main memory and cache are synchronized each time there is an inquiry. However, in the case of a pseudo write back cache system, synchronization is done prior to any access by any other device occurring. That is, the synchronization is performed as soon as the controller detects that an external device is being set up by the CPU for a transfer. The fundamental postulate is that the application software will not touch a region in main memory which it has set up for a data transfer. However, the application software is not aware of the length of a cache line.

Consider a line in cache consisting of 4 bytes and the corresponding 4 bytes in main memory each containing data ABCD as shown

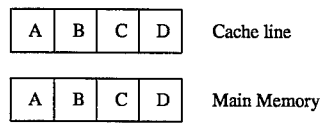

In this condition, cache and main memory are coherent.

Assume now that the CPU is setting up an external device to write to main memory in a space that includes the bytes with data C and D, but not bytes A and B.

The external device then writes to the maim memory space. The line in main memory is as follows:

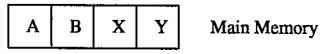

However, the corresponding line in cache is still:

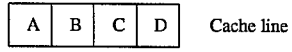

During the period that the external device is set up to write to main memory, the application software will not make any access to the main memory space that has been set up for the transfer. But bytes A and B are outside of the main memory transfer space. Thus during the time that the external device was transferring data to the main memory space, the CPU can modify the first two bytes of the line in cache to be P and Q. Thus the corresponding line in cache would be:

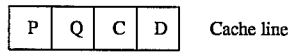

At the end of the data transfer, the corresponding memory locations would be:

Thus, there is no coherency. Main memory has the most current data for the last two bytes (X and Y) and the cache has the most current data for the first two bytes (P and Q).

In order to get coherency and keep the most current data bytes P and Q, and only P and Q, are written back to the main memory. Thus main memory would appear:

Then, the line in the cache is invalidated.

In order to better understand the invention, it is useful to compare the memory state diagram of a write back cache memory in a system that supports write back cache memory with the state diagram of the present invention. As is well known, the cache is designed to hold not only the actual data, but additional bits that indicate the status of that data. A write through cache typically has 1 bit per cache line and a write back cache typically has 2 bits per cache line. In a write through cache, their can be only two states: either a line is valid or it is invalid.

In a write back cache, four states are used to insure cache coherency. A protocol called MESI Cache Coherency Protocol is used by most suppliers of write back caches. The four MESI states are: (M) A line can be modified which means after it has been brought into the cache, the CPU has written to that line but that line has not been written back to the main memory. That is, the line is different than the corresponding main memory locations. (E) A line can be exclusive in which case it contains data which is the same as in main memory. (I) A line can be in the invalid state. This state is used when there is invalid data within a line and that line can be used for new data coming into the cache. (S) A line can also be in the shared state. This state is used typically in a multiprocessing environment where there are multiple processors which might share the line.

Figure 3:
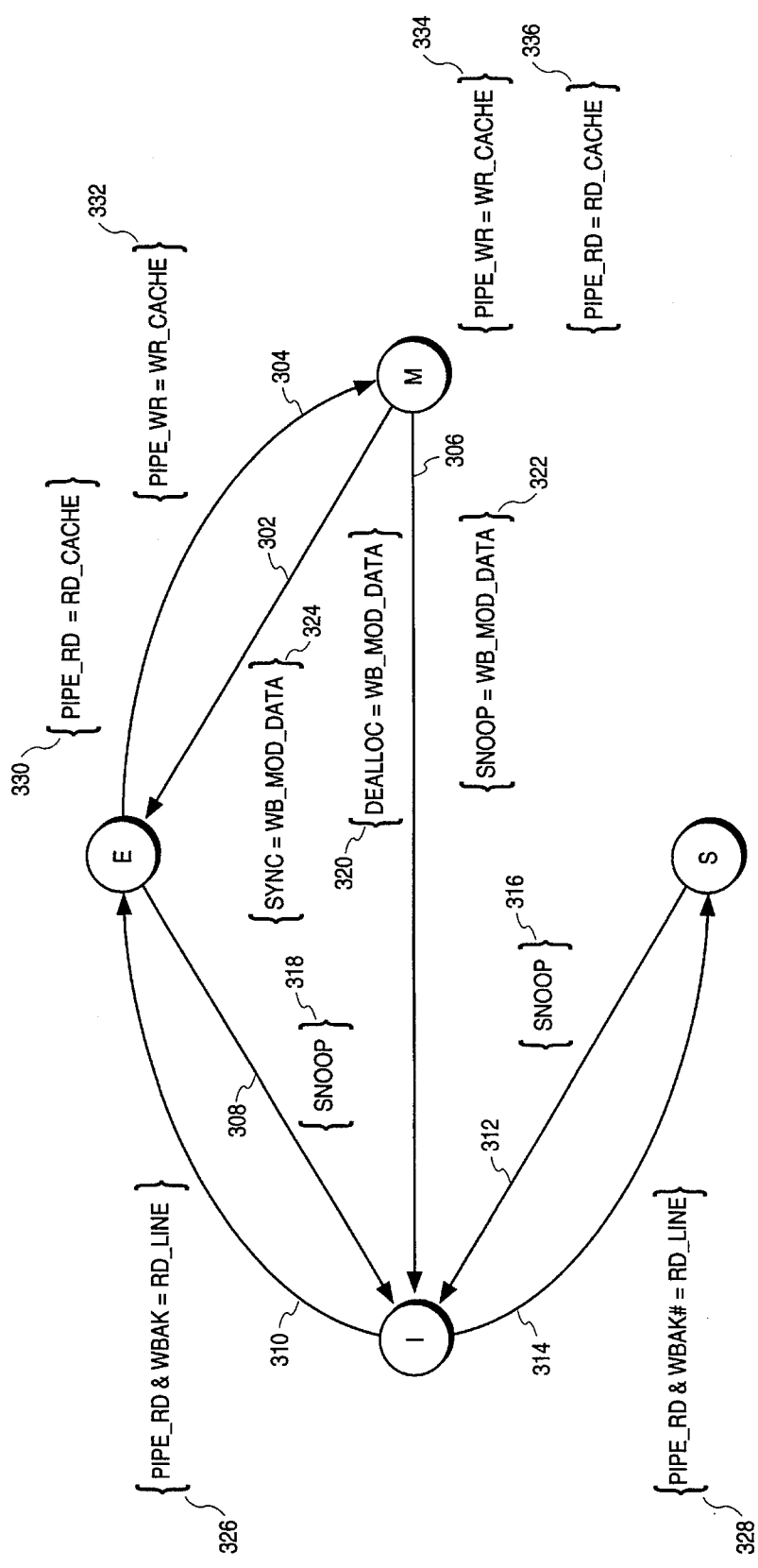
FIG. 3 is a protocol state diagram of the present invention.

FIG. 3 is a MESI protocol diagram modified in accordance with the present invention. Arrow 302 implies a transition from the modified state (M) to the exclusive state (E). Arrow 304 implies a transition from the exclusive state (E) to the modified state (M). Arrow 306 implies a transition from the modified state (M) to the invalid state (I). Arrow 308 implies a transition from the exclusive state (E) to the invalid state (I). Arrow 301 implies a transition from the invalid state (I) to the exclusive state (E). Arrow 312 implies a transition from the shared state (S) to the invalid state (I) . And arrow 314 implies a transition from the invalid state (I) to the shared state (S)

Certain events will cause the logic in the cache controller to change the state of a line in cache. The events in FIG. 3 are those that are different than those used in a standard write back cache.

At reference numeral 316 and 318 the event is a snoop. In the case of a standard write back cache, the event is snoop and invalidate. This is because there is no invalidate signal coming from system logic to the CPU in a pseudo write back system. Therefore, on a snoop, the line is simply taken from the shared to the invalid state or from the exclusive to the invalid state.

At reference numeral 320, the event is a deallocation. The action is write back the modified data. The difference between this and the standard write back cache is that only modified data, usually bytes, rather than the entire line is written back. This improves performance because it takes less time on the bus.

At reference 322, the event is detection of a snoop. The action is to write back modified data. Again there is no invalidate signal. At reference numeral 324, the event is the assertion of a sync signal. The action is to write back modified data and take the line to the exclusive state. Note that if a snoop occurs, and there is some data in the modified state, that data is taken to an invalid state after it is written back to main memory. Whereas, if a synchronization occurs, the action is to write back the data in the cache in the modified state to main memory and take the line to the exclusive state. At that point the cache is coherent. Therefore, all data is put in the exclusive state.

At reference numeral 326, the relevant line is in the invalid state. The event is a pipe read and the write back signal is asserted. The action is to read the line and take the line from the invalid to the exclusive. Likewise at reference numeral 328, if with that same line the action is a pipe read and the write back signal is not asserted, the action is to take the line to the shared state. At reference numeral 330, the line is in the exclusive state and the event is a pipe read. The action is read the cache and keep the line in the exclusive state. At reference numeral 332, the line is in the exclusive state and the action is pipe write. The action is to write to cache and take the line to the modified state. At reference numeral 334, the line is in the modified state and the event is a pipe write. The action is to write to the line and keep it in the modified state. At reference numeral 336, the line is in the modified state and the event is a pipe read. In this case the action is again to read the cache and keep the line in the modified state.

The CCM generates the write back (wbak) signal. The value of the wbak signal indicates to the CPU/cache memory to cache the line in either the exclusive or shared state.

Figure 4:
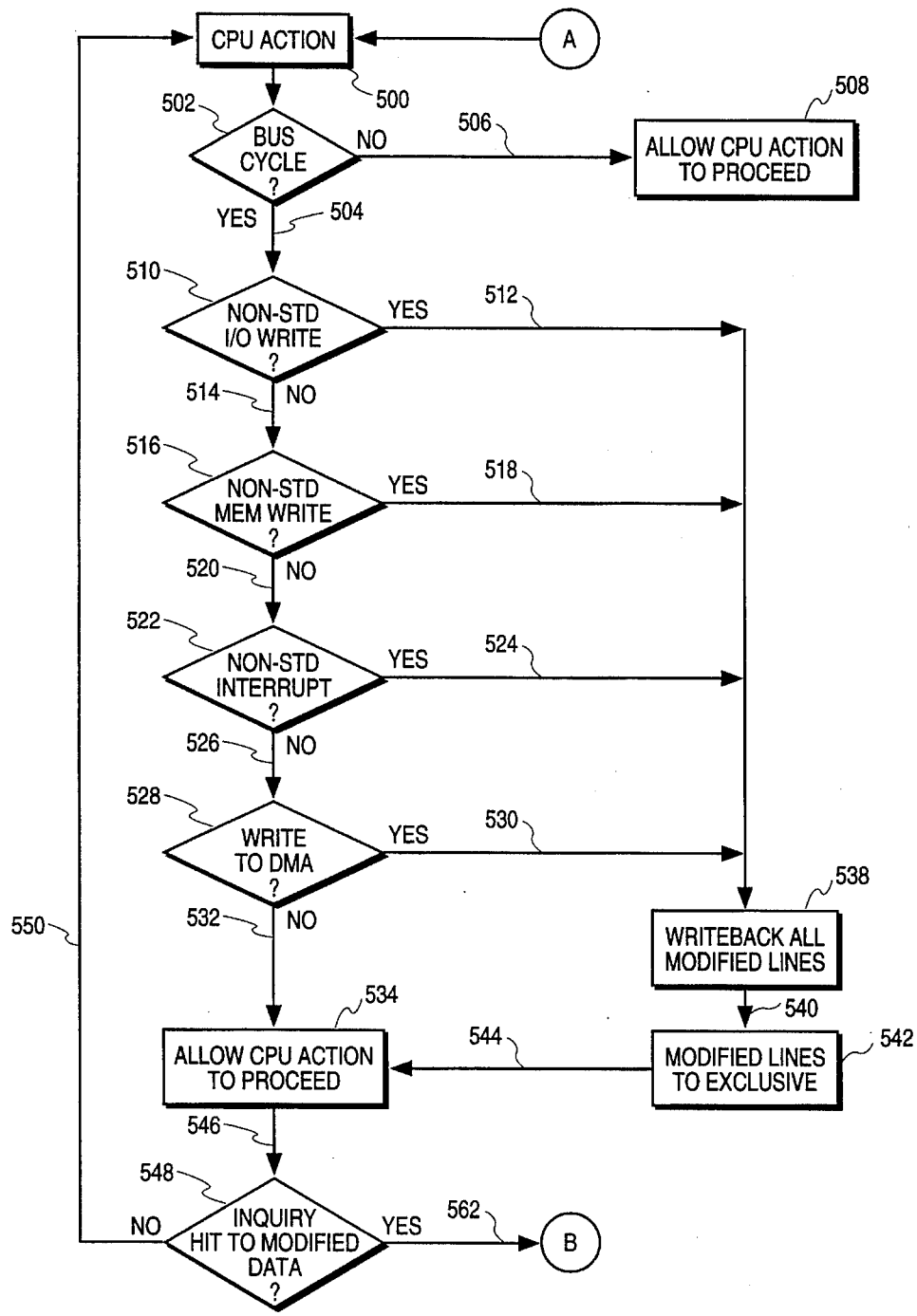
FIG. 4 is a flow chart describing the method of the present invention.

FIG. 4, is a block diagram of the logic of the invention. The logic is located in the cache control module, preferably inside of the processor. This logic is required because the functionally equivalent logic is not present at the bus level.

Referring to FIG. 4, processing block 500 indicates a CPU command or action. The CPU runs several types of cycles. The logic in the CCM monitors the CPU cycles. As indicated by decision block 502, if the CPU initiates a bus cycle to access I/O or main memory or any of the external devices then the logic checks further to see whether that command, action or cycle is relevant to cache coherency by following process path 504. If not, follow process path 506 to process block 508 where the CPU action initiated in block 500 is allowed to continue. Process path 504 leads to decision block 510 in which the CCM logic determines if the cycle is a non-standard I/O write. If yes, follow process path 512. If no, follow process path 514 to decision block 516 where the cycle is tested to see if it is a write to non-standard memory. If yes, follow process path 518. If no, follow process path 520 to decision block 522 where the cycle is tested to see if it is a non-standard interrupt. If yes, follow process path 524. If no, follow process path 526 to decision block 528 where the cycle is tested to see if it is a write to a DMA register. If yes, follow process path 530. If no, follow process path 532 to process block 534 and allow the CPU action initiated in process block 500 to proceed. If the decision in blocks 510, 516, 522 and 528 are all no, a cache coherency destroying event has not occurred and no action is taken by the logic of the invention. But if the decision in any of decision blocks 510, 516, 522 and 528 is yes, then the CPU action initiated by process block 500 is either a non-standard I/O write or a non-standard main memory write or a non-standard interrupt or a write to the DMA and the process follows path 536 to process block 538. In process block the 538 all modified lines in the cache memory are written back to main memory. This function is performed when control logic sub-module 42 generates a sync signal on line 46 to cache controller 47 in FIG. 2. After the modified lines are written back to main memory, follow process path 540 to process block 542 where the state of each modified line in cache is changed to exclusive. At this point, cache and main memory are synchronized.

Once the cache and main memory are synchronized, that is cache and main memory are coherent, then the CPU action is allowed to proceed to the outside world as indicated by following process path 544 to process block 534.

At process block 534, the cache and main memory are synchronized, and the CPU action is allowed to continue. Thus follow process path 546 to decision block 548 where the CCM monitors the bus looking for snoop inquiries that find modified data. These are called hits to modified data. If this condition does not occur, continue the cpu action initiated in process block 500 as indicated by process path 550. If however, a hit to modified data occurs, then take process path 552 to the remainder of the process which is set out in FIG. 5.

Figure 5:
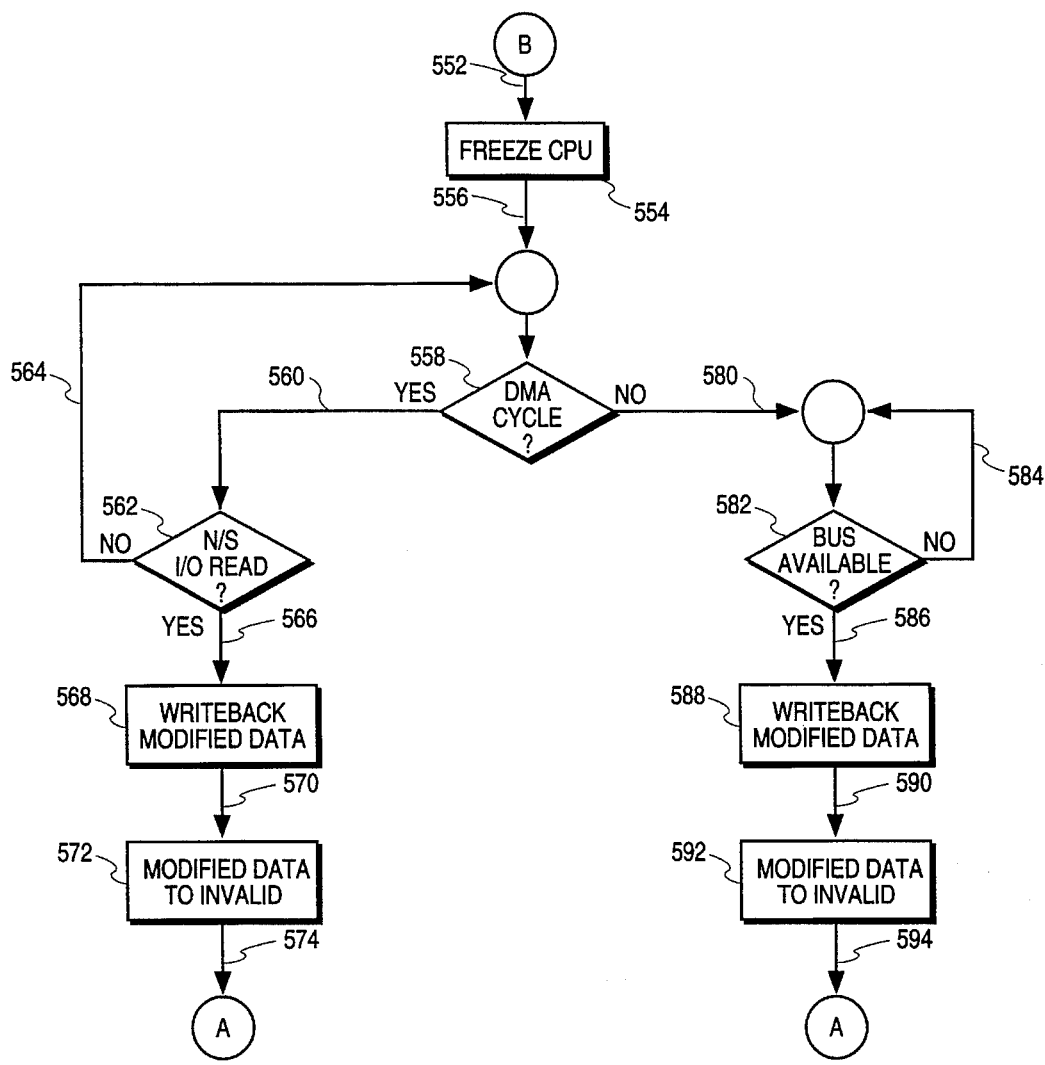
FIG. 5 is a continuation of the flow chart of FIG. 4

Referring now to FIG. 5, if a hit to modified data is detected, the CPU is frozen at that moment as indicated by process block 554. That is, a signal called the freeze CPU is asserted by control logic 42 in CCM 30 and supplied to the CPU. When the freeze CPU signal is asserted, from that moment forward, the CPU is no longer allowed to access the cache memory until the signal is deasserted.

After assertion of the freeze signal in process block 554, follow process path 556 to decision block 558 where logic determines whether a DMA cycle is in progress. If yes, follow process path 560 to decision block 562 where the system commences looking for the end of the access by the external device. This is accomplished by reading the status registers of the DMA. If no, follow process path 564 back to decision block 558 and repeat the loop. Once the completion of the DMA transfer is detected, follow process path 566 to process block 568 and write back the modified bytes as indicated in cache tag array 49. The entire modified line is not written back. After writing back the modified bytes, follow process path 570 to process block 572 and invalidate the lines in cache that contain the modified bytes.

After taking the line to invalid, follow process path 574 through reference A back to process block 500 in FIG. 4.

Referring again to decision block 558, if the decision is no, follow process path 580 to decision block 582 where the system monitors the bus for access. The loop consisting of decision block 582 and process path 584 is a loop designed to determine when the bus is available. When the bus is available, follow process path 586 to process block 588 and write back the modified bytes as indicated in cache tag array 49. The entire modified line is not written back. After writing back the modified bytes, follow process path 590 to process block 592 and invalidate the lines in cache that contain the modified bytes. After taking the line to invalid, follow process path 574 through reference A back to process block 500 in FIG. 4.

According to another aspect of the invention a hardware flag is added to the cache which indicates that no lines within the cache have been modified since the last synchronization, and it is not necessary to synchronize again. The applications software running on the CPU could write to many non-standard I/O locations—one right after the other. If this occurs, it would be necessary to synchronize every time that a write occurs which would be a hit to performance.

It will be appreciated from the foregoing that the preferred embodiment is subject to numerous adaptations and modifications without departing from the scope of the invention. Therefore, it is to be understood that, within the scope of the appended claims, the invention may be practiced other than as specifically described.

What is claimed is:

1. A write back cache coherency system for a computer wherein said computer includes at least one bus that contains snooping signals but not write back support signals, a CPU communicating with said bus, a cache memory communicating with said CPU and having a plurality of addresses for storing data which are organized into lines and a plurality of status bits indicating at least whether a line is in an invalid, modified or exclusive state, a main memory communicating with said bus, a DMA controller connected to said bus, at least one device to said bus, a plurality of additional addressable devices in said computer system each connected to a bus, said cache coherency system comprising:

a cache tag array connected to said cache memory, said cache tag array containing one bit per byte in said cache memory and adapted to indicate if a particular byte in cache has been written to by said CPU;

a cache coherency module added to computer, said cache coherency module including a bus snooping sub-module connected to said bus for monitoring the address and control signals thereon, a system address sub-module which includes a DMA address table containing the addresses of registers of said DMA controller, an I/O address table containing the addresses of all non-standard I/O devices, a memory table containing the addresses of all non-standard memory addresses and a non-standard interrupt table, and a logic sub-module is connected to said bus snooping sub-module and said system address sub-module and providing control signals to said cache memory, said logic sub-module in conjunction with said bus-snooping sub-module and said system address sub-module being adapted to:

indicate when said DMA controller is programmed by said CPU to allow an external I/O device to read or write to main memory, and upon such an event, supplying a signal to said cache memory causing the synchronization thereof with said main memory;

indicate when said CPU performs a write to a non-standard I/O or memory address, and upon such an event, supply a signal to said cache memory causing the synchronization thereof with said main memory;

indicate when a non-standard interrupt has been sent to the CPU by an external device, and upon such an event, supply a signal to said cache memory causing the synchronization thereof with said main memory;

indicate when an inquiry cycle is being run and a hit to a modified line has occurred as a result thereof, and upon such an event, supply a signal to said CPU that stops CPU access to said cache memory;

indicate when said external I/O device has completed its read or write to main memory as programmed by said DMA, and upon such event, supply a signal to said cache memory causing any modified data therein to be written back to said main memory and changing the line containing said modified data to the invalid state.

2. In a computer system which includes one or more busses that contain snooping signals but not backoff signals, a CPU connected to said bus, a cache memory connected to said CPU and having a plurality of bytes organized into lines and a plurality of status bits indicating at least whether a line was in a modified or exclusive state, a main memory space, an I/O address space, a plurality of addressable devices some portion of which have standard addresses in I/O address space, a DMA controller having registers programmable by said CPU to allow external I/O devices to write to main memory and a status register indicating the condition of said write by an external I/O device and one or more external devices capable of accessing main memory through said DMA controller, and wherein said computer system supports a conventional interrupt scheme including standard and non-standard interrupts, a method of maintaining cache coherency comprising:

monitoring said bus for and detecting an action consisting of said DMA controller being programmed to allow an external device to read or write to main memory, and if such a action is detected, then:

synchronizing said cache;

monitoring the snoop inquire cycles on said bus and detecting any inquiry hit to modified data in said cache;

upon detecting an inquiry hit to modified data in said cache, preventing further access by said CPU to cache to until completion of the read or write to main memory by said external device programmed by said DMA is detected;

upon detection of said completion, writing back all bytes in cache memory in the modified state and causing said cache lines in which said modified data is contained to be put in said invalid state; and allowing said CPU to continue processing; and monitoring said bus for and detecting an action consisting of a write to non-standard I/O space by said CPU, a write to non-standard memory space by said CPU, or a non-standard interrupt, and if such an event is detected, then:

synchronizing said cache and main memory after detecting such event;

monitoring said snoop inquire cycles on said bus and detecting any inquiry hit to modified data in said cache;

upon detecting an inquiry hit to modified data in said cache, preventing access by said CPU to said cache;

acquiring control of said system bus and writing back said modified data and causing said cache lines in which said modified data is contained to be put in said invalid state; and allowing said CPU to continue processing.

3. A pseudo write back cache memory system for a computer having a CPU, main memory and a plurality of external devices all of which are connected to a bus that does not have bus level signals to implement a conventional write back cache memory, said system comprising:

a write back cache memory connected to said CPU, said cache memory being organized into words and including a line status logic that allows each line to be in any one of the following states: exclusive, modified, invalid or shared;

a bus snooping sub-module connected to said bus for monitoring the address and control signals thereon, wherein said bus-snooping sub-module including an address comparator circuit;

a system address sub-module connected to said bus snooping sub-module, said system address sub-module including:

a DMA address table containing the addresses of registers of a DMA controller;

an I/O address table containing the addresses of all non-standard I/O devices;

a memory table containing the addresses of all non-standard memory addresses; and a non-standard interrupt table containing the codes for all non-standard interrupts;

a logic sub-module connected to said bus snooping sub-module and said system address sub-module and providing control signals to said cache memory;

means connected to said detection means and said cache memory for synchronizing said cache memory with said main memory upon detecting an access request and prior to access by said device, said synchronizing means including logic in said logic sub-module responsive to said snooping sub-module and said system address sub-module for providing:

a write back signal to said cache memory upon detection of an access request; and a state signal causing data in said cache in the modified state to change to the exclusive state;

means connected to said cache memory for detecting data in said cache memory that has been modified since the most recent synchronization of said cache and main memory;

means connected to cache memory for freezing said CPU upon detection of said modification;

means connected to said cache memory for causing said modified data detected by said detection means to be written back to said main memory; and means for making said modified data not available to said CPU.

4. The pseudo write back memory system of claim 3 wherein said CPU freezing means comprises a signal generated by said control sub-module.

5. The pseudo write back memory system of claim 4 wherein said means connected to said cache memory for causing said modified data detected by said detection means to be written back to said main memory comprises a write back signal generated by said control sub-module.

6. The pseudo write back memory system of claim 5 wherein said means for making said modified data not available to said CPU comprises a signal generated by said control sub-module and supplied to said cache memory for causing the state of lines with modified data to be in the invalid state.

\* \* \* \* \*